United States Patent Office 2,853,464
Patented Sept. 23, 1958

2,853,464

POLYESTER PLASTICIZED VINYLIDENE CHLORIDE POLYMERS

Max Henry Dilke, Coulsdon, and Basil Alexander Ripley-Duggan, Harlow, England, assignors to The Distillers Company Limited, Edinburgh, Scotland, a British company No Drawing. Application February 15, 1956
Serial No. 565,533

Claims priority, application Great Britain
February 17, 1955

4 Claims. (Cl. 260—45.4)

The present invention relates to plasticised compositions derived from vinylidene chloride polymers.

It has now been discovered that polyesters derived from the inter-esterification of a phthalic acid with m- or p-bis-(α-hydroxyethyl) benzene are useful plasticisers for vinylidene chloride polymers and copolymers and give plasticised compositions having adequate thermal stability at the working temperature when used in sufficiently low concentrations to give products of adequate rigidity or tensile strength. In particular the compositions have good heat stability and may readily be extruded at temperatures above the softening point of the vinylidene chloride polymer or copolymer without undergoing any serious degradation with the production of highly discoloured products.

The invention comprises the novel products as well as the novel processes and steps of processes according to which such products are manufactured, the specific embodiments of which are described hereinafter by way of example and in accordance with which I now prefer to practice the invention.

Accordingly, the present invention is a plasticised composition comprising a vinylidene chloride polymer or copolymer in which the plasticiser is a polyester obtained by the interesterification of a phthalic acid or phthalic anhydride with meta- and/or para-bis-(α-hydroxyethyl) benzene.

The polyester plasticisers may be prepared by any of the usual esterification techniques which are well known in the art provided that care is taken to prevent dehydration or other unwanted side reactions of the bis-(α-hydroxyethyl) benzene occurring. Large quantities of mineral acid catalysts should be avoided because they may cause gelation of the reaction mixture. The essential structure of the ester plasticisers is as follows:

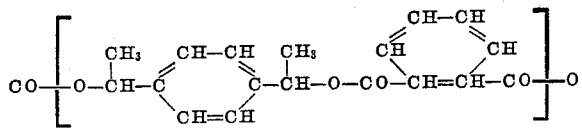

and the corresponding structures obtained from meta-bis-(α-hydroxyethyl) benzene and from the meta- and para-phthalic acids. The repeating ester unit is shown within the square brackets.

Any phthalic acid may be employed, i. e. phthalic acid, isophthalic acid and terephthalic acid. It is preferred to use phthalic acid which may advantageously be employed in the form of its anhydride, namely phthalic anhydride.

The proportion of bis-(α-hydroxyethyl) benzene to the phthalic acid used in the preparation of the polyester plasticisers may be varied considerably but it is preferred to employ from 0.5 to 1.5 moles of a phthalic acid to each mole of bis-(α-hydroxyethyl) benzene present in the esterification reaction mixture and most suitably approximately equimolar proportions are employed.

Suitable vinylidene chloride polymers and copolymers include polyvinylidene chloride and copolymers of vinylidene chloride with one or more copolymerisable compounds such as vinyl chloride, methyl acrylate, ethyl acrylate, methyl methacrylate, dimethyl maleate, diethyl maleate, vinyl acetate and acrylonitrile which are monomers containing the group —CH=C<. The copolymers preferably contain at least 10% by weight of vinylidene chloride units. The polyester plasticisers are particularly useful for the plasticisation of polymeric resins containing more than 70% by weight of vinylidene chloride units in their molecular structure. Such resins are characterised by their ability to exist in crystalline and orientated crystalline states and by their tendency to form crystallites during processing and for these reasons they have hitherto been found particularly difficult to plasticise and work.

The amount of polyester plasticiser which may usefully be incorporated with the polymeric resin containing the vinylidene chloride units depends to some extent on the particular resin chosen and on the properties desired in the final product, in general, polyester plasticiser contents of from 5 to 50 percent of the weight of the resin are suitable. The polyester plasticised compositions of the present invention are particularly suitable for the production of fibres or filaments when the polymeric resin contains more than about 70% vinylidene chloride units. With a fibre forming resin such as that prepared by the polymerisation of a monomer mixture of 85% by weight of vinylidene chloride and 15% by weight of vinyl chloride, the preferred quantity of polyester plasticiser is of the order 7–14% of the weight of the resin. With less than 5% of polyester plasticiser, the composition does not usually flow readily enough on heating and the extruded filament is discoloured due to degradation, whilst with more than 15% of polyester plasticiser, the tensile strength of the extruded filaments tends to become too low.

The polyester plasticiser may be mixed with the polymeric resin in any suitable way. Thus, for example, the polyester plasticiser may be added directly to the finely powdered resin and intimate mixing effected by mechanical means, such as grinding in a ball mill. Alternatively, the polyester plasticiser may be dissolved in a volatile organic solvent, such as acetone or benzene, the solution thoroughly mixed with the powdered resin and the solvent removed from the resulting composition by drying. If the polymeric resin is capable of being dissolved in an organic solvent, the polyester plasticiser may be added to the said solution to form a homogeneous mixture, and the plasticised composition recovered by evaporation. If the resin is available in the form of an aqueous dispersion of small particles, a solution of the polyester plasticiser in a water-miscible organic solvent, such as ethanol, acetone, or dioxan, can be added slowly with stirring to the dispersion, and the resulting uniform polymeric composition separated by filtration or other suitable means and subsequently dried. If the polymeric resin containing the vinylidene chloride unit is to be prepared in aqueous dispersion, the polyester plasticiser may be added to the monomer mixture prior to or during the polymerisation; at the end of polymerisation, an intimate mixture of plasticiser and finely divided resin may be separated by coagulation, filtration, or other suitable means.

The manner in which the polyester plasticisers of this invention are added to the polymeric resin containing vinylidene chloride units is not critical, provided that intimate mixing is obtained. The resulting compositions, however, prepared, show satisfactory flow properties and adequate heat stability at the temperatures required for processing. It is well known that the light stability of plasticised compositions containing vinylidene chloride polymers depends not only on the light stabilizing compound present but also on the plasticiser used. Compositions according to the present invention, containing known light stabilisers, show considerable stability on exposure to sunlight or light containing a high proportion of ultra-violet radiation. In addition to light stabilisers, compositions in which the polyester plasticisers are incorporated may also contain, or be compounded with, lubricants, pigments, dyes and the like, used for the purpose of facilitating the processing of the compositions or for providing the required colour in the final article. Other heat-stabilisers used or described in the literature can also be present.

The following examples illustrate the practice of the invention, percentages and parts referred to being by weight unless otherwise specified.

*Examples 1 to 3*

Polyester plasticisers were prepared by melting 1:4-bis ($\alpha$-hydroxyethyl) benzene, referred to in the table as diol, in a suitable vessel and then adding phthalic anhydride in the indicated proportions over a period of approximately ¾ hour. Efficient stirring was maintained, and a brisk current of nitrogen passed through the mixture to carry off excess water. The quantities and temperatures employed and the total time of the reaction are given in the following table:

| Example | Moles of diol | Moles of anhydride | Temperature | Time (hrs.) |
|---|---|---|---|---|
| 1 | 1 | 0.5 | 140° C. | 1½ |
| 2 | 1 | 1 | 140° C. rising to 185° C. | 2 |
| 3 | 1 | 1.5 | 140° C. | 4½ |

In all the examples each of the polyester plasticisers were produced as thermoplastic pale-coloured brittle resins having low softening points.

10% of these polyester plasticisers were included in a vinylidene chloride/vinyl chloride copolymer (85/15) and the plasticised composition was satisfactorily extruded into fibers at 170–175° C. by means of a small ram extruder.

We claim:

1. A plasticised composition comprising a member of the group consisting of polyvinylidene chloride and copolymers of vinylidene chloride with copolymerizable monomer compounds containing the structural group —CH=C<, said copolymers containing at least 10% by weight of vinylidene chloride units in their molecular structure, and as plasticiser, a polyester obtained by the inter-esterification of a member of the group consisting of the phthalic acids and phthalic anhydride with a dihydric alcohol selected from the group consisting of meta and para-bis-($\alpha$-hydroxyethyl) benzene and mixtures thereof, said plasticiser constituting 5 to 50% of the plasticised composition.

2. A plasticised composition as claimed in claim 1 wherein the plasticiser is obtained from the inter-estification of from 0.5 to 1.5 molecular proportions of acid to each molecular proportion of dihydric alcohol.

3. A plasticised composition as claimed in claim 1, wherein the copolymers contain more than 70% by weight of vinylidene chloride units in their molecular structure.

4. A plasticised composition comprising a copolymer obtained by the polymerisation of a monomer mixture consisting of about 85% by weight of vinylidene chloride and about 15% by weight of vinyl chloride together with about 7–14% based on the weight of the copolymer of a polyester plasticiser obtained by the interesterification of a member of the group consisting of the phthalic acids and phthalic anhydride with a dihydric alcohol selected from the group consisting of meta and para-bis-($\alpha$) hydroxyethyl) benzene and mixtures thereof.

References Cited in the file of this patent

UNITED STATES PATENTS

| 2,437,046 | Rothrock et al. | Mar. 2, 1948 |
| 2,647,099 | Smith | July 28, 1953 |